US011761688B2

(12) United States Patent
Canino et al.

(10) Patent No.: US 11,761,688 B2
(45) Date of Patent: Sep. 19, 2023

(54) SOLAR INTEGRATED CHILLER METHOD AND SYSTEM

(71) Applicant: SMARDT CHILLER GROUP INC., Dorval (CA)

(72) Inventors: Vincent Canino, Foothill Ranch, CA (US); Gregory Tutwiler, Bridgewater, VA (US)

(73) Assignee: TICA-SMARDT CHILLER GROUP INC., Dorval (CA)

( * ) Notice: Subject to any disclaimer, the term of this patent is extended or adjusted under 35 U.S.C. 154(b) by 0 days.

(21) Appl. No.: 18/096,268

(22) Filed: Jan. 12, 2023

(65) Prior Publication Data

US 2023/0147460 A1  May 11, 2023

Related U.S. Application Data

(63) Continuation of application No. 16/071,332, filed as application No. PCT/CA2017/050070 on Jan. 24, 2017, now abandoned.

(60) Provisional application No. 62/286,824, filed on Jan. 25, 2016.

(51) Int. Cl.
    *F25B 27/00* (2006.01)
    *H02S 20/30* (2014.01)
    *F24S 25/12* (2018.01)

(52) U.S. Cl.
    CPC .............. *F25B 27/00* (2013.01); *F24S 25/12* (2018.05); *H02S 20/30* (2014.12); *F25B 2600/111* (2013.01)

(58) Field of Classification Search
    None
    See application file for complete search history.

(56) References Cited

U.S. PATENT DOCUMENTS

| 4,939,986 | A | 7/1990 | Garvin, Jr. |
| 6,644,045 | B1 | 11/2003 | Tang et al. |
| 10,088,187 | B2 * | 10/2018 | He .............................. F24F 11/30 |
| 10,356,962 | B2 * | 7/2019 | Li ....................... H05K 7/20936 |
| 10,995,697 | B1 * | 5/2021 | Sherry ................. H02K 7/1815 |
| 2013/0327077 | A1 | 12/2013 | Motsenbocker |
| 2015/0000725 | A1 | 1/2015 | Reilly et al. |

FOREIGN PATENT DOCUMENTS

| AU | 2011100120 A4 | 4/2011 |
| CN | 1773193 A | 5/2006 |
| CN | 100414218 C | 8/2008 |
| CN | 203798002 U * | 8/2014 |

(Continued)

OTHER PUBLICATIONS

JP2018-538770-2nd OA with translation, Mar. 30, 2021.

*Primary Examiner* — Leigh M Garbowski
(74) *Attorney, Agent, or Firm* — NORTON ROSE FULBRIGHT CANADA LLP

(57) ABSTRACT

An air cooled oil-free centrifugal chiller system and method, the system comprising at least one AC condenser fan; at least one solar panel; at least one AC/DC convertible fan connected to the at least one solar panel; and a controller configured to determine when sufficient DC power is available and activating the at least one AC/DC convertible fan when sufficient DC power is available, and when DC power is not sufficient, activating the at least one AC condenser fan.

12 Claims, 18 Drawing Sheets

(56) References Cited

FOREIGN PATENT DOCUMENTS

| | | |
|---|---|---|
| CN | 204612028 U | 9/2015 |
| JP | S56108074 A | 8/1981 |
| JP | H04174262 A | 6/1992 |
| JP | 2002076407 A | 3/2002 |
| JP | 2002168498 A | 6/2002 |
| JP | 2009270797 A | 11/2009 |
| JP | 2010506087 A | 2/2010 |
| JP | 2010190460 A | 9/2010 |
| JP | 2011234619 A | 11/2011 |
| JP | 2012253985 A | 12/2012 |

* cited by examiner

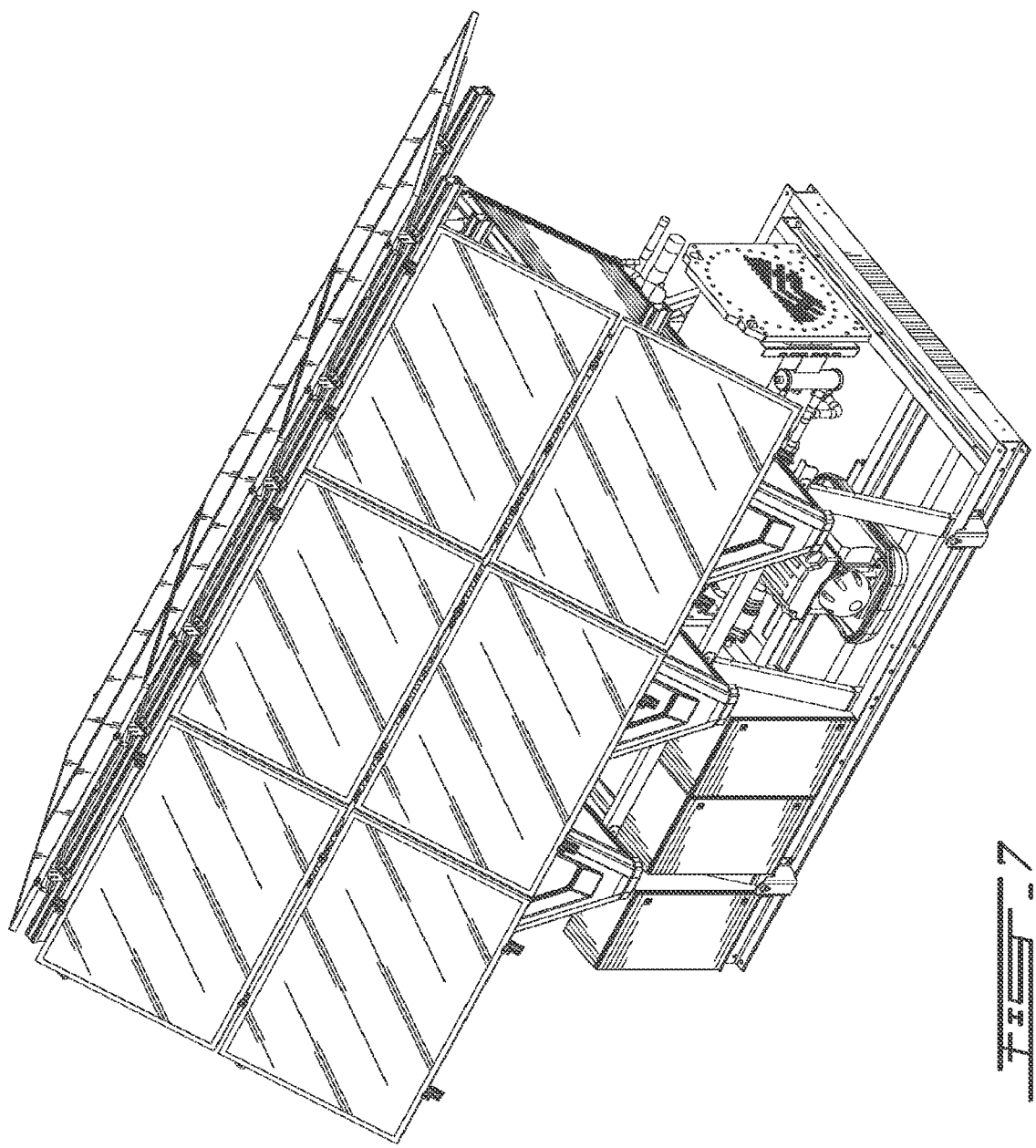

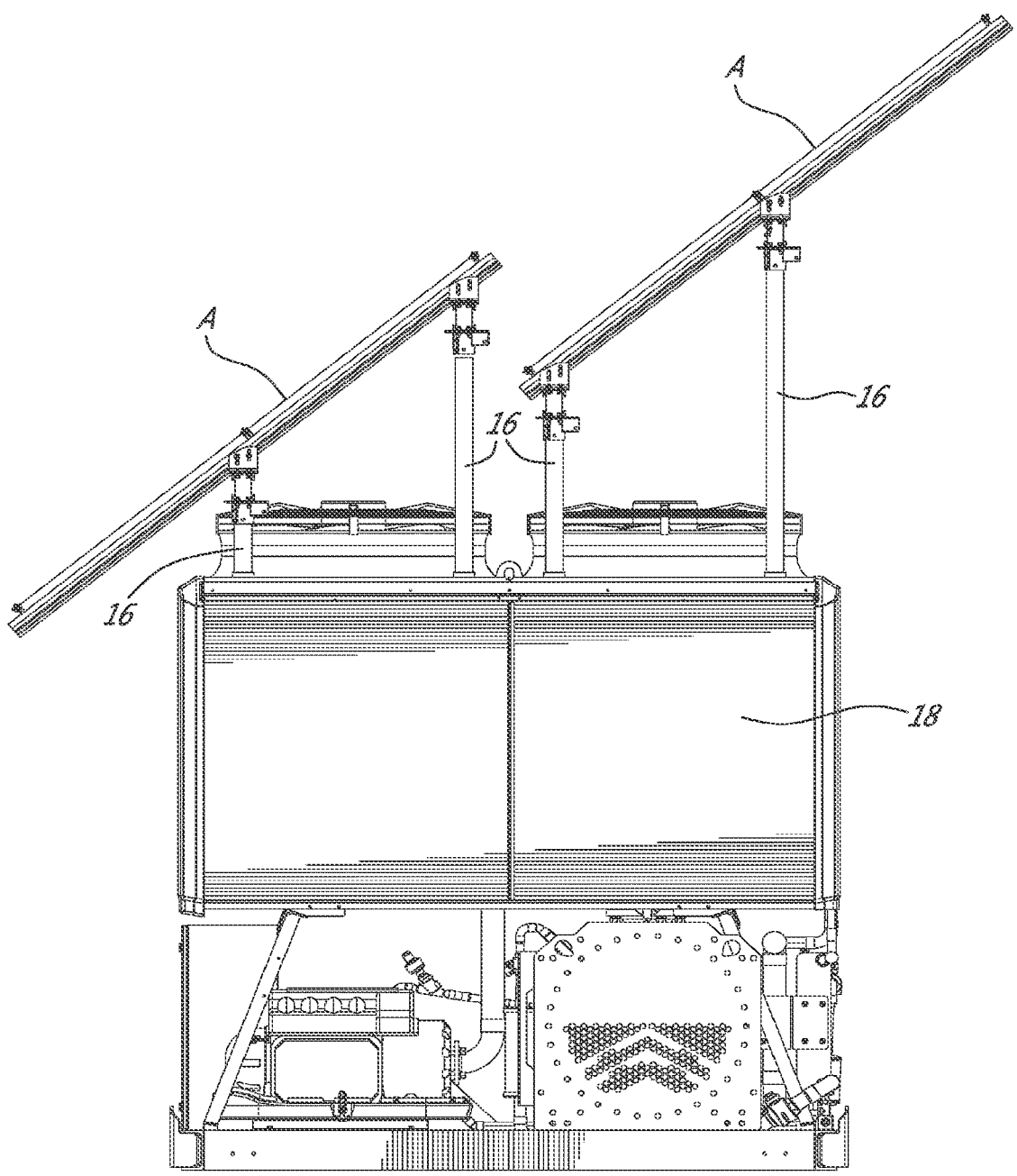

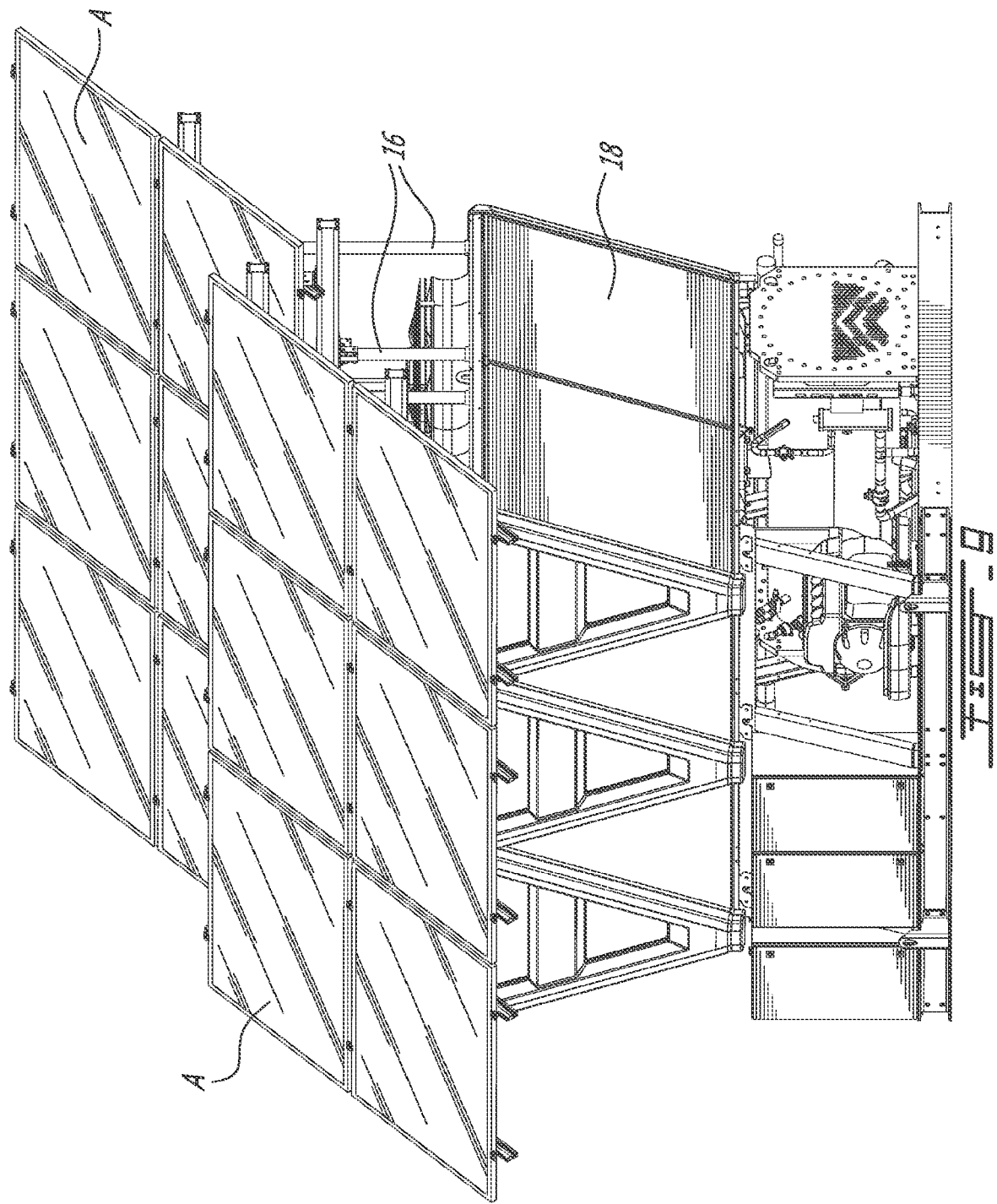

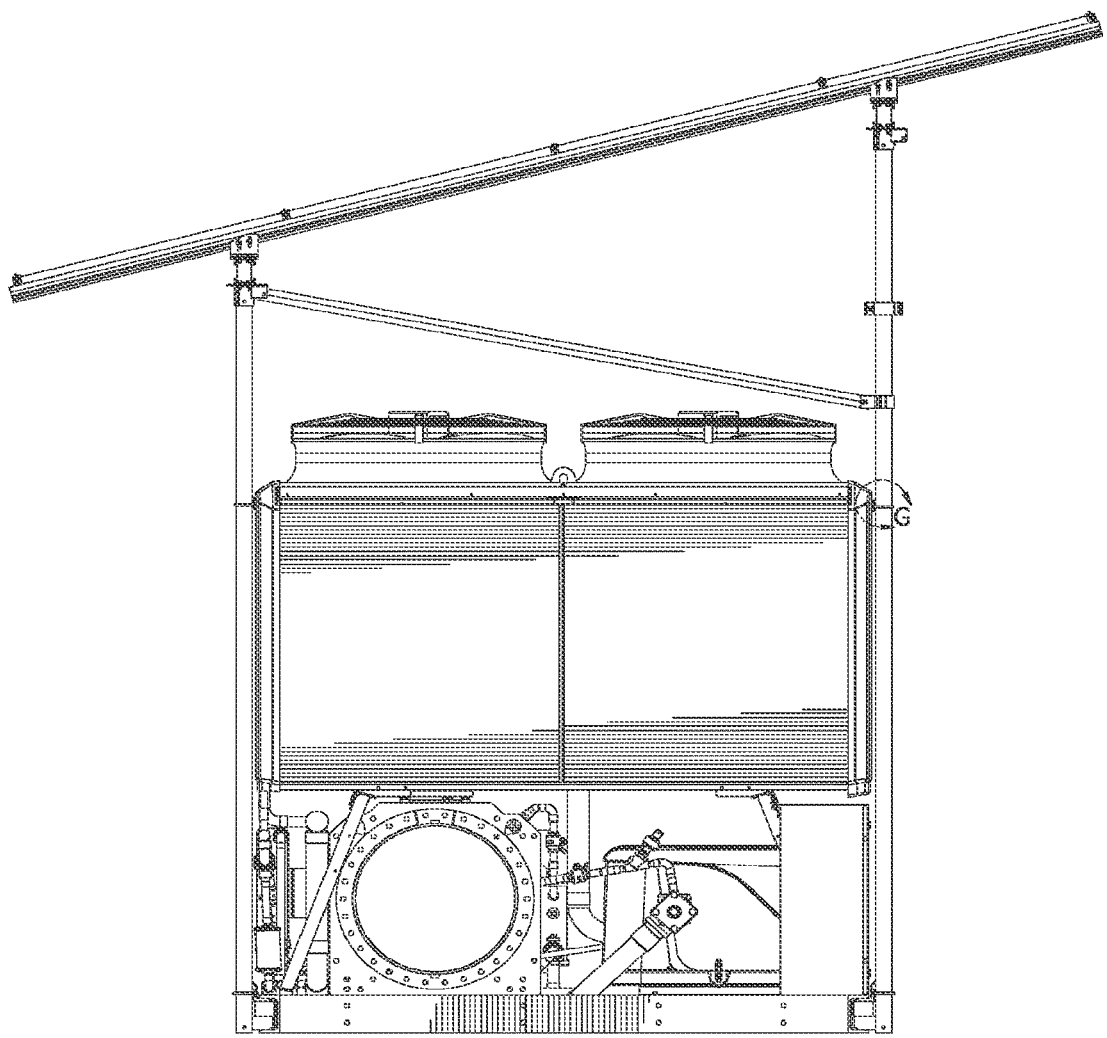

SOLAR INTEGRATED CHILLER METHOD AND SYSTEM

CROSS-REFERENCE TO RELATED APPLICATION

This application is a continuation of U.S. patent application Ser. No. 16/071,332 filed Jul. 19, 2018 which is a National Entry Application of PCT application No. PCT/CA2017/050070 filed on Jan. 24, 2017 and published in English under PCT Article 21(2), which itself claims benefit of US provisional application Ser. No. 62/286,824, filed on Jan. 25, 2016. All documents above are incorporated herein in their entirety by reference.

FIELD OF THE INVENTION

The present invention relates to chillers. More specifically, the present invention is concerned with a solar integrated chiller, method and system.

SUMMARY OF THE INVENTION

More specifically, in accordance with the present invention, there is provided a system comprising at least one AC condenser fan; at least one solar panel; at least one AC/DC convertible fan connected to the at least one solar panel; and a controller configured to determine when sufficient DC power is available and activating the at least one AC/DC convertible fan when sufficient DC power is available, and when DC power is not sufficient, activating the at least one AC condenser fan.

There is further provided a method for powering an air cooled oil-free centrifugal chiller system comprising condensers, at least one AC/DC convertible fan and at least one DC fan, the method comprising providing at least one solar panel and connecting the AC/DC convertible fan to the at least one solar panel; determining i) when sufficient DC current generated by the solar panel is available and then running the AC/DC convertible fan, and ii) when the solar-generated DC current is not sufficient, running the DC fan.

There is further provided a method for directly powering a AC/DC convertible fan of an air cooled oil-free centrifugal chiller using DC solar-generated current, comprising providing at least one solar panel and a controller; connecting the AC/DC convertible fan to the at least one solar panel; determining, by the controller, i) when sufficient DC solar-generated current is available and then running the AC/DC convertible fan, and ii) when sufficient DC solar-generated current is not available, running the AC/DC convertible fan using a battery bank.

Other objects, advantages and features of the present invention will become more apparent upon reading of the following non-restrictive description of specific embodiments thereof, given by way of example only with reference to the accompanying drawings.

Description

BRIEF DESCRIPTION OF THE DRAWINGS

In the appended drawings:

FIG. 7 is a top view of the system of FIG. 6;

FIG. 8 is a side view of a system according to an embodiment of an aspect of the present invention;

FIG. 9 is a perspective view of the system of FIG. 8;

FIG. 11C is a second side view of the system of FIG. 10;

DESCRIPTION OF ILLUSTRATIVE EMBODIMENTS

The present invention is illustrated in further details by the following non-limiting examples.

An air cooled oil-free centrifugal chiller typically comprises condenser fans (C).

Figure 10A:
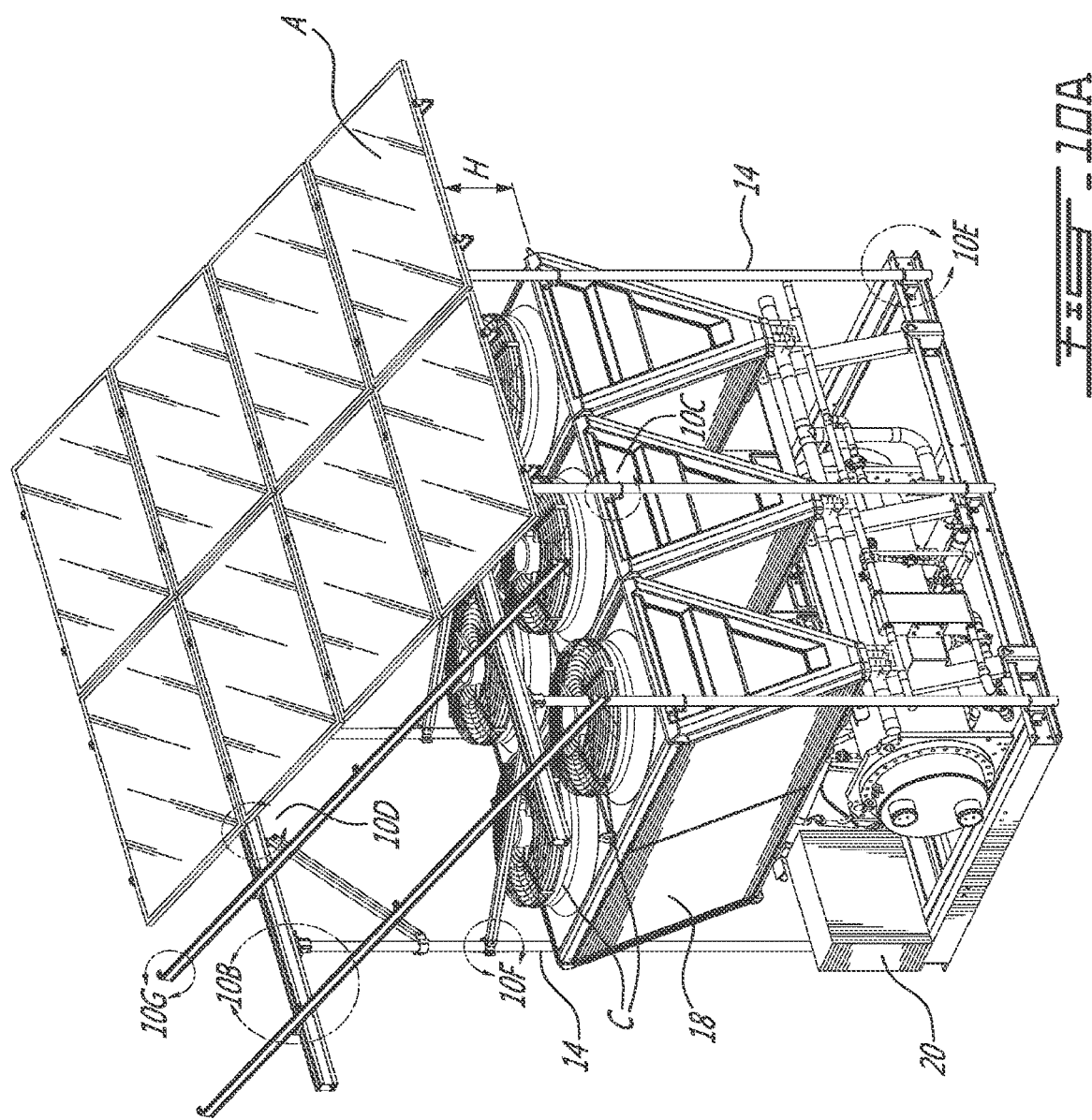
FIG. 10A is a schematic view of a system according to an embodiment of an aspect of the present invention.
Figure 10B:
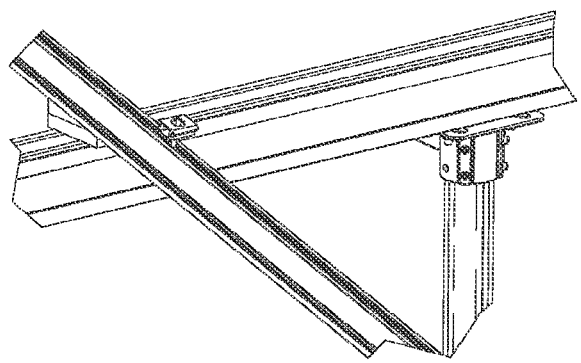
FIG. 10B shows a detail of FIG. 10A.
Figure 10C:
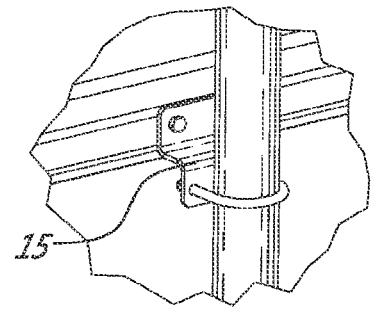
FIG. 10C shows a detail of FIG. 10A.
Figure 10D:
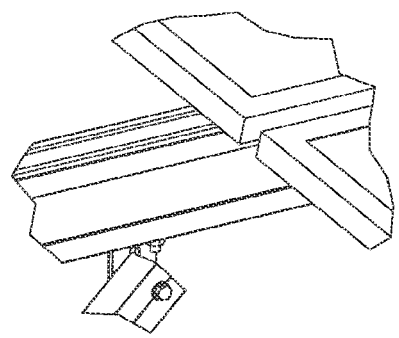
FIG. 10D shows a detail of FIG. 10A.
Figure 10E:
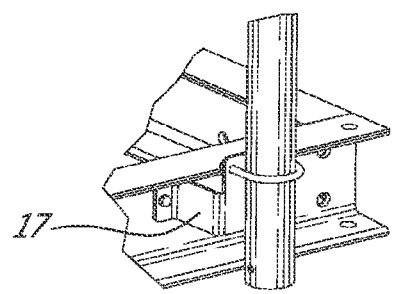
FIG. 10E shows a detail of FIG. 10A.
Figure 10F:
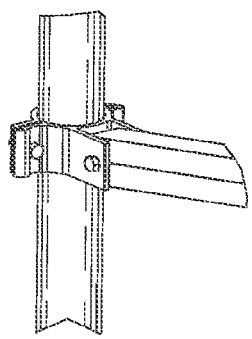
FIG. 10F shows a detail of FIG. 10A.
Figure 10G:
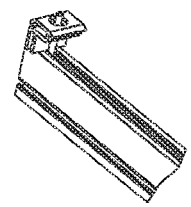
FIG. 10G shows a detail of FIG. 10A.
Figure 11A:
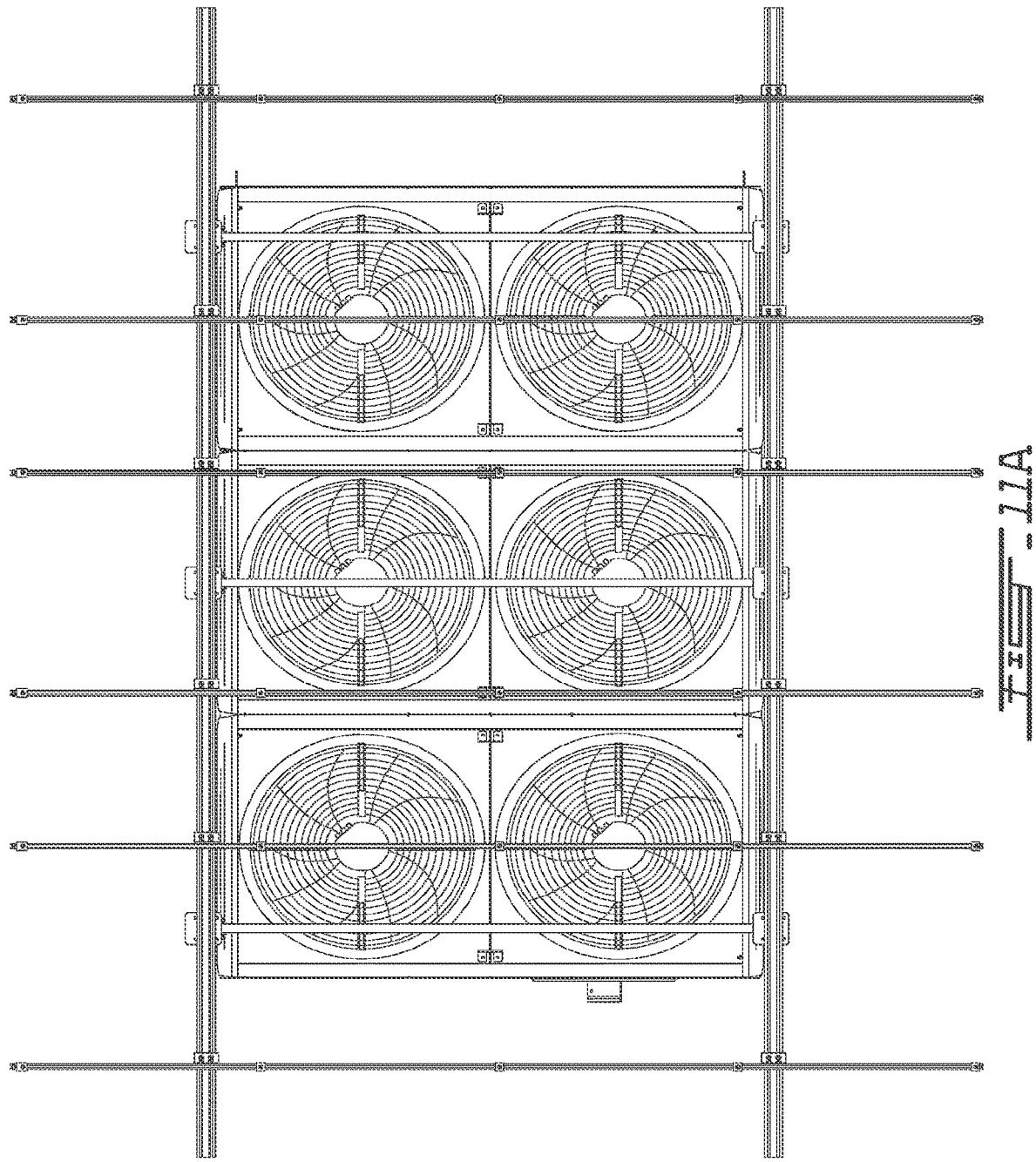
FIG. 11A is a top view of the system of FIG. 10.
Figure 11B:
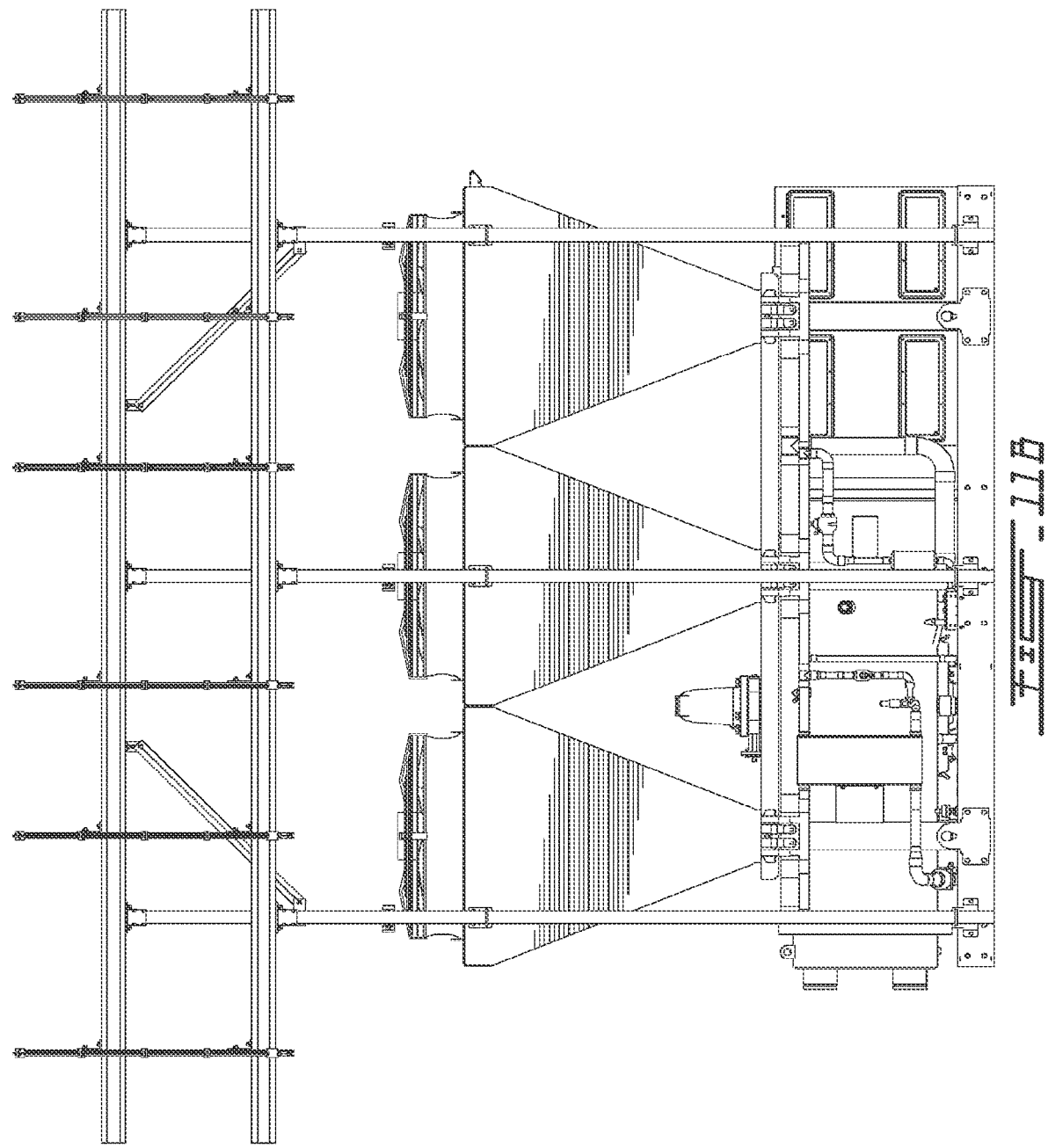
FIG. 11B is a first side view of the system of FIG. 10.

As illustrated for example in FIGS. 10A and 11C, an array (A) of solar panels is mounted above the condenser fans (C), at a distance from the top edge of the condenser fans, for example at a minimum height H of 450 mm above the top surface of the condenser fans, at an angle in a range between about 15 and 40° from the horizontal, for example at an angle of about 15° from the horizontal, depending upon the geographical position and time of the year, i. e. for best incidence of sun rays on the solar panels, i.e. incidence at an angle between about between 37° and about 45° for example.

Figure 1:
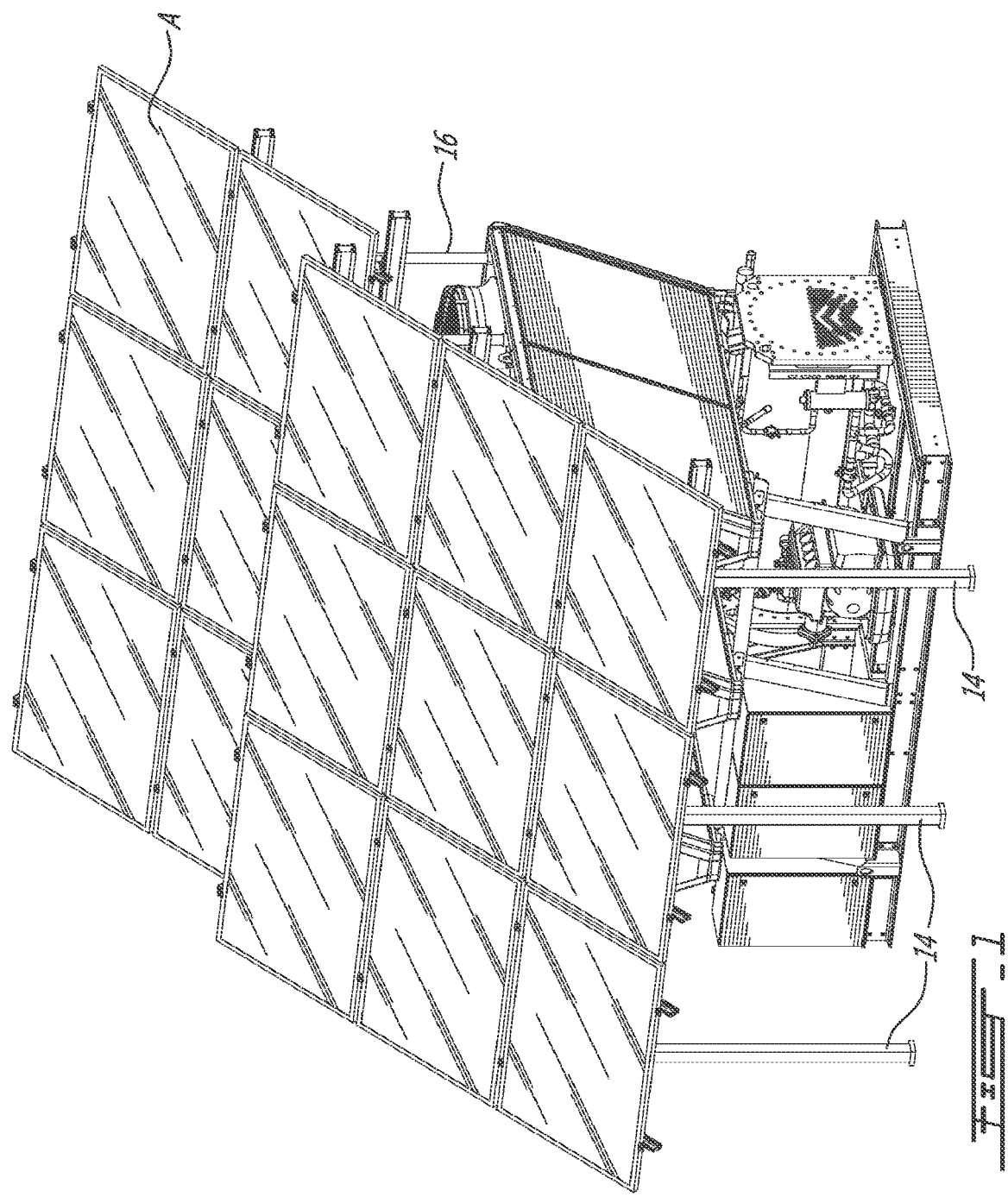
FIG. 1 is a perspective view of a system according to an embodiment of an aspect of the present invention.
Figure 2:
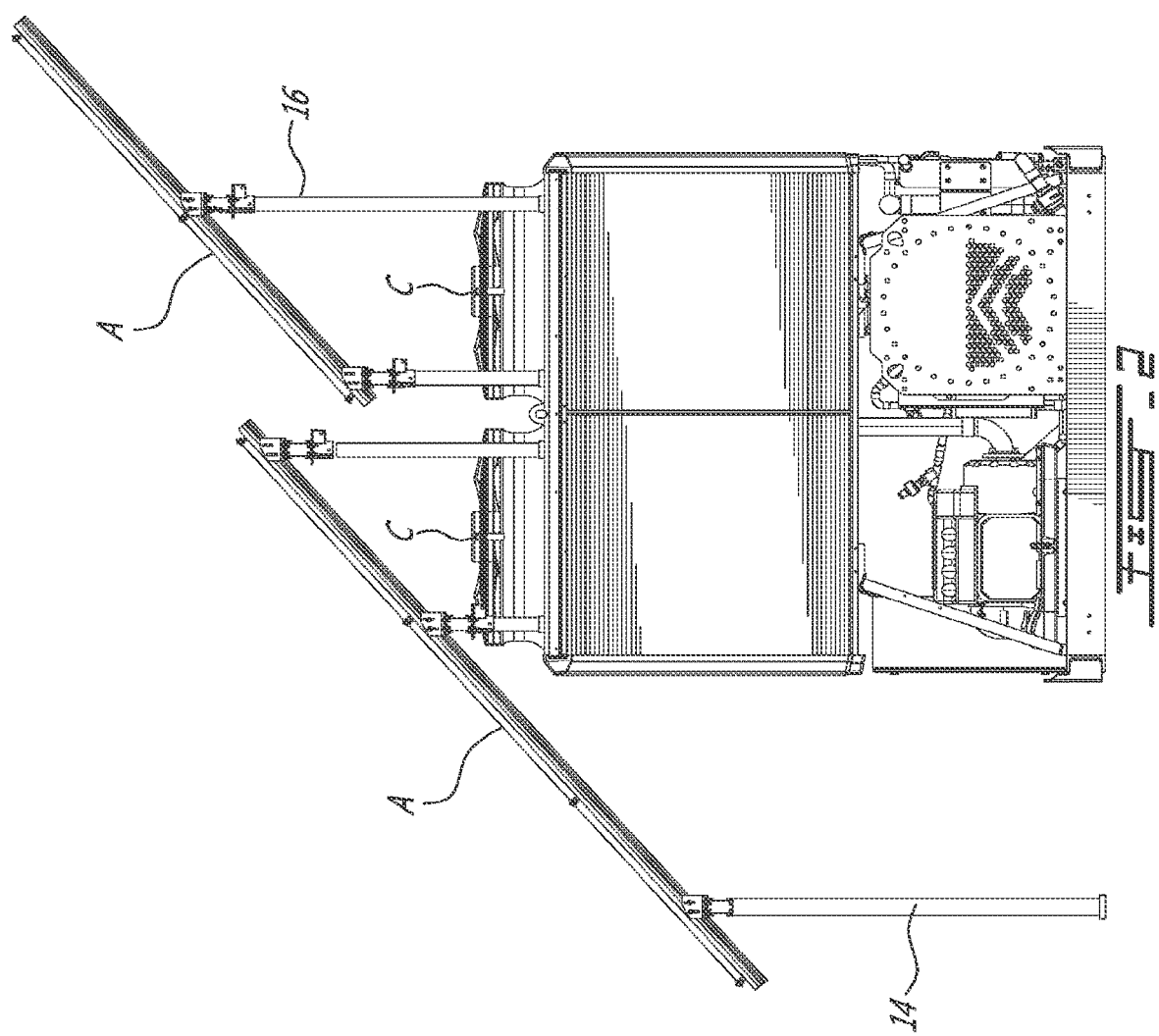
FIG. 2 is a side view of the system of FIG. 1.
Figure 3:
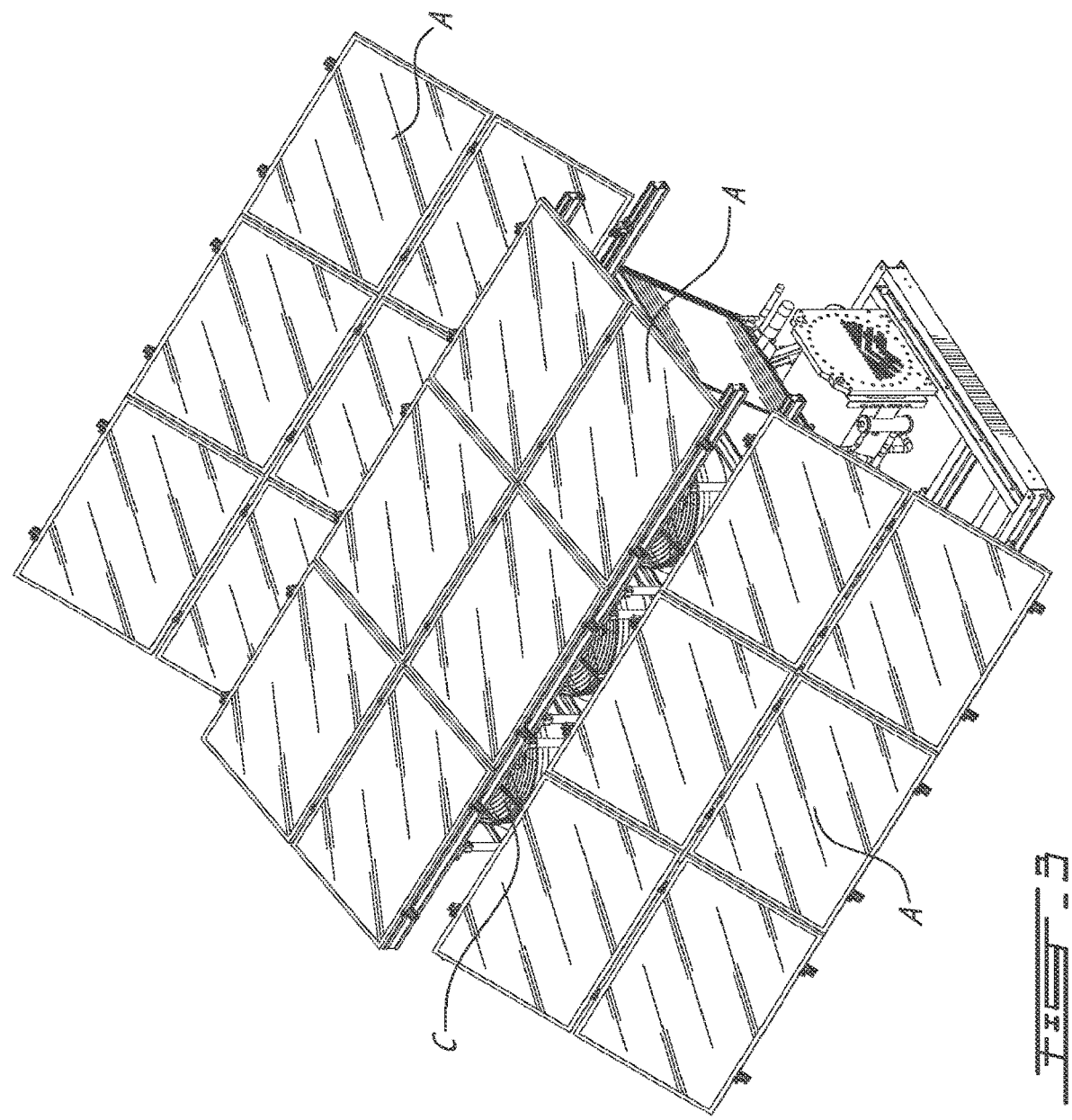
FIG. 3 is a perspective view of a system according to an embodiment of an aspect of the present invention.
Figure 4:
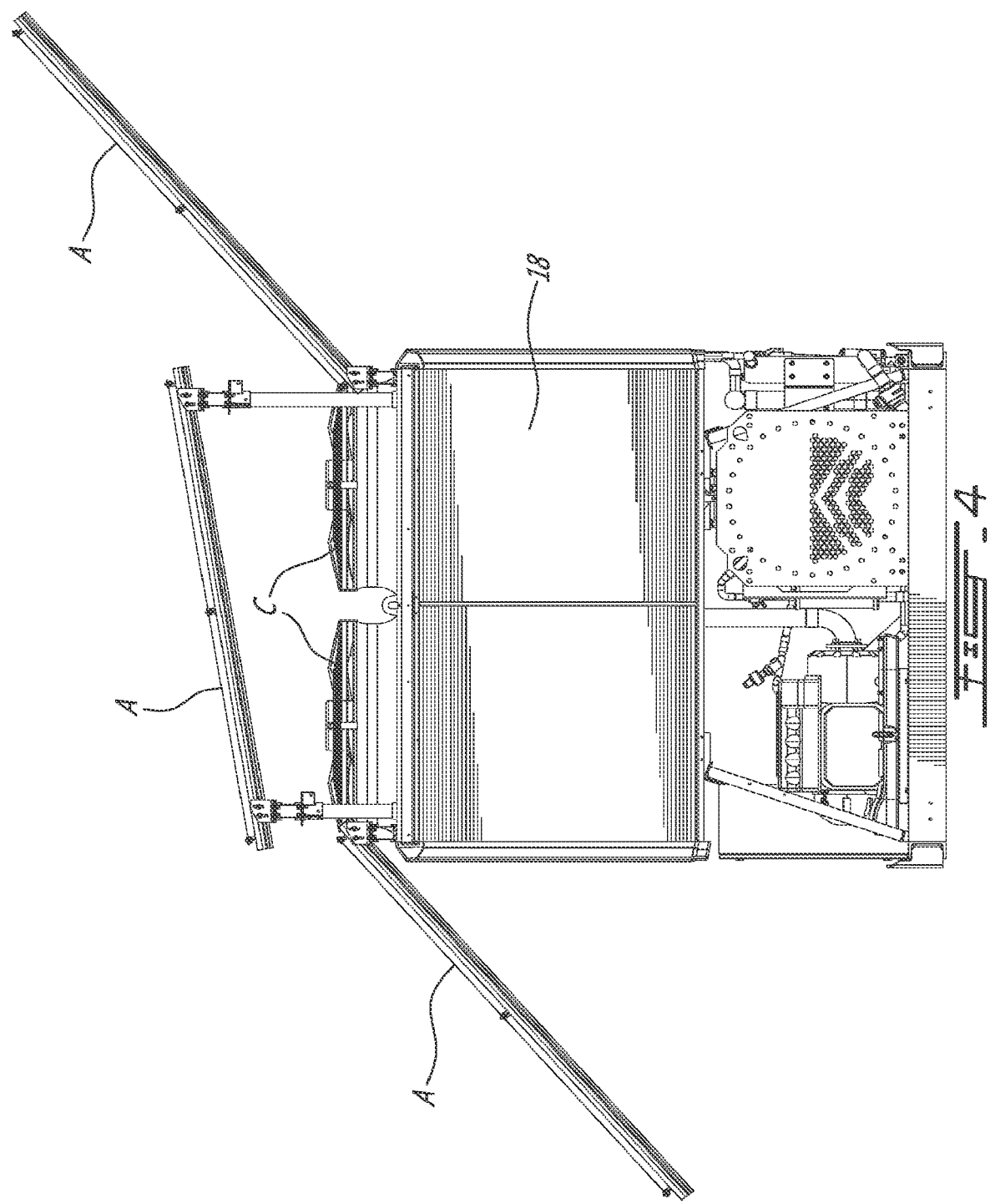
FIG. 4 is a side view of FIG. 3.
Figure 5:
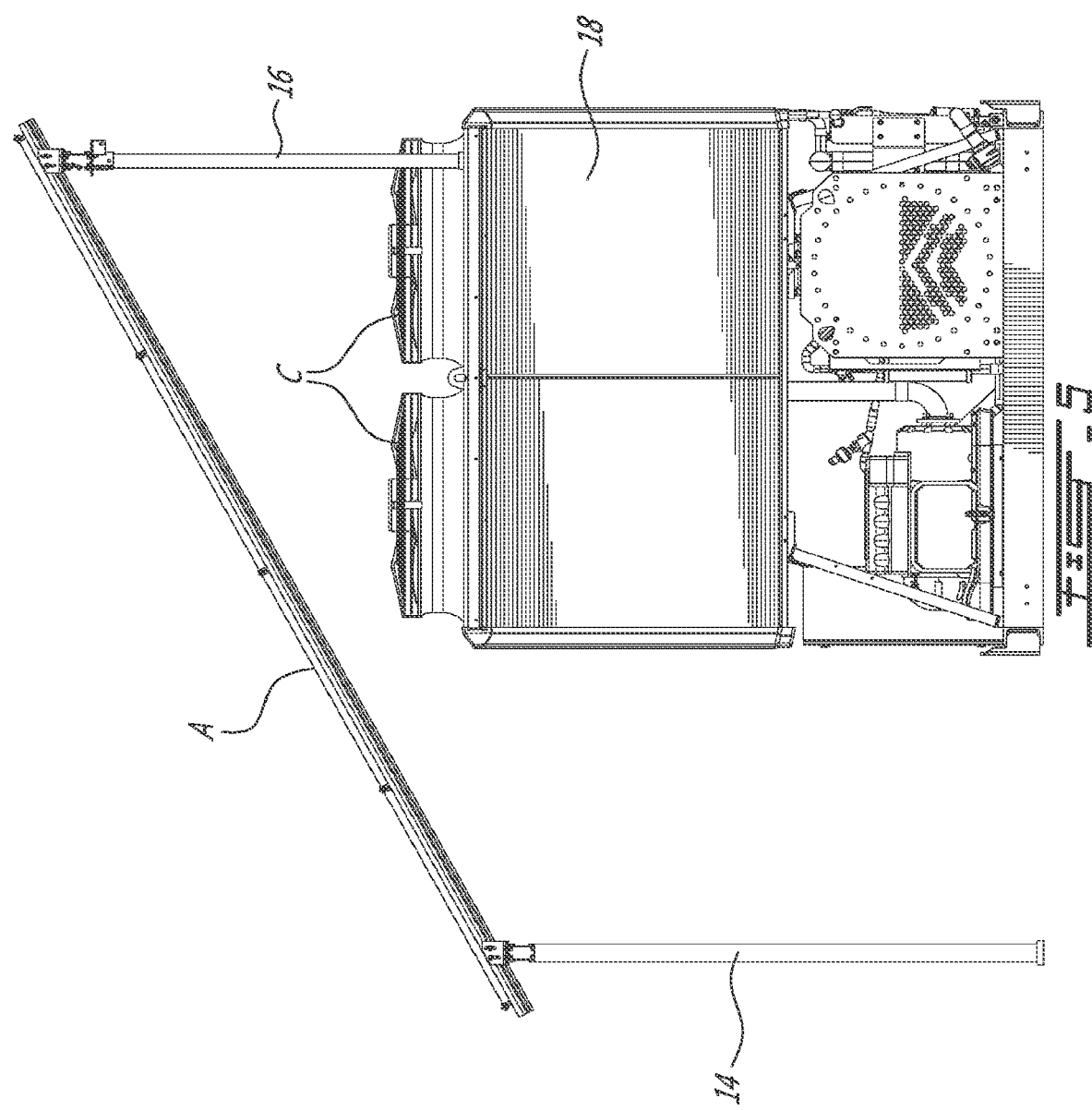
FIG. 5 is a side view of a system according to an embodiment of an aspect of the present invention.
Figure 6:
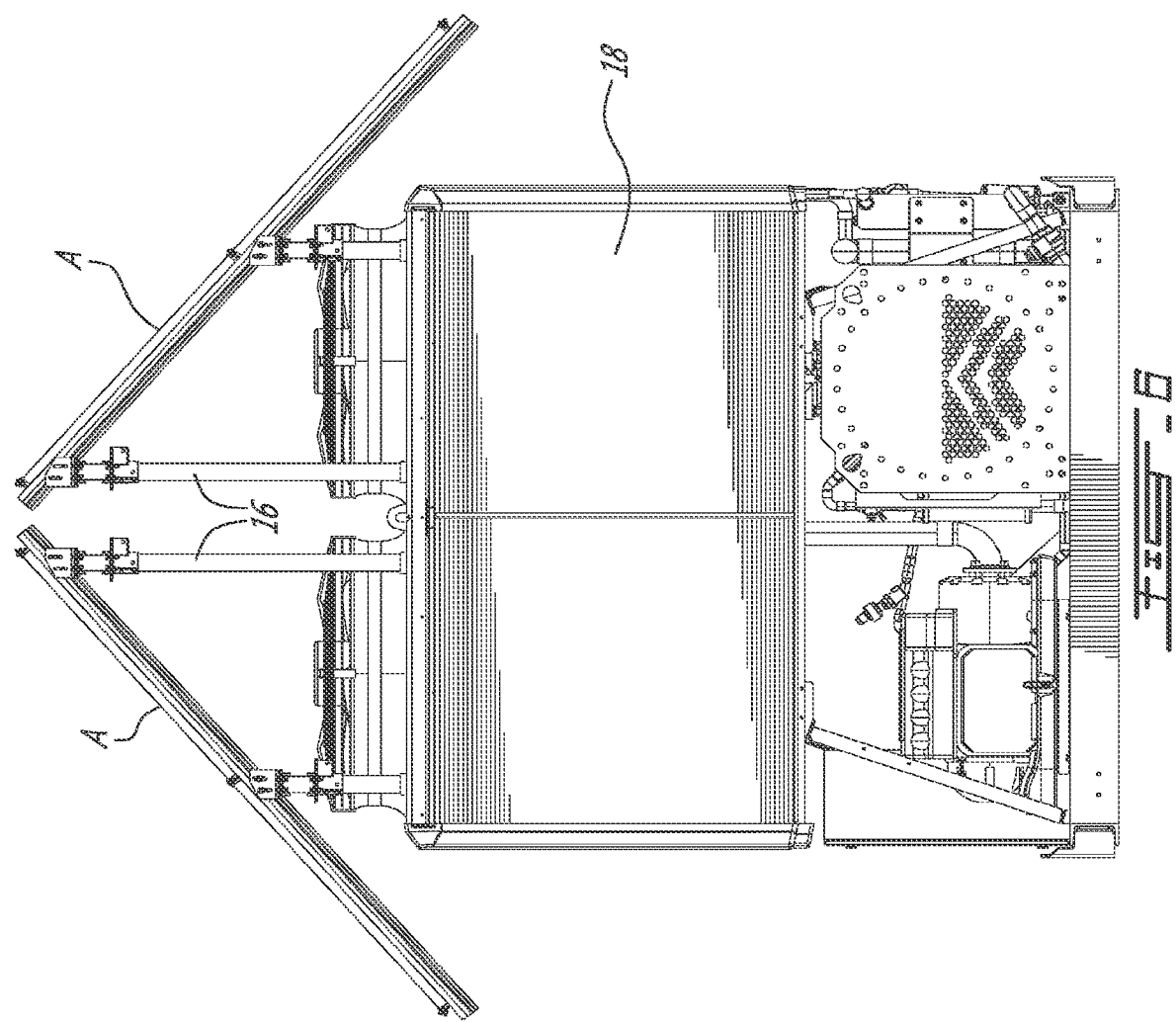
FIG. 6 is a side view of a system according to an embodiment of an aspect of the present invention.
Figure 12B:
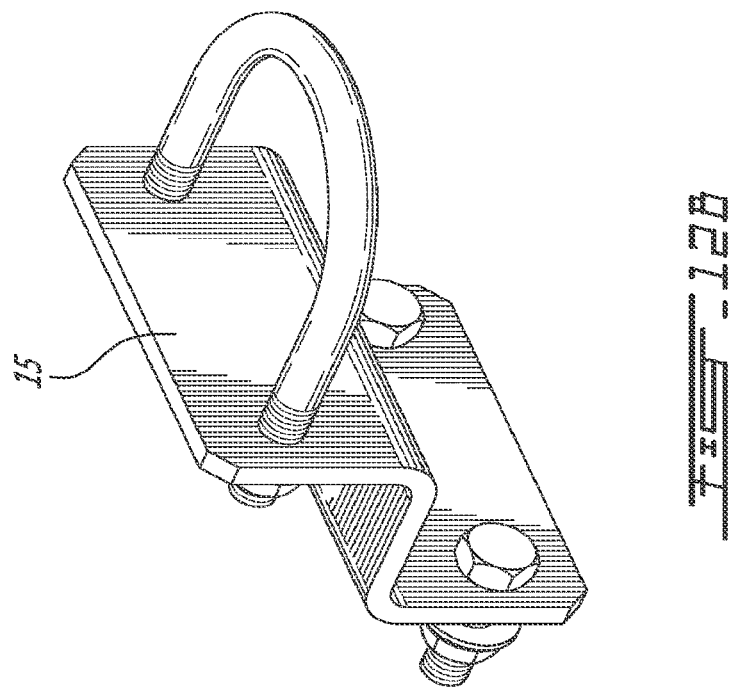
FIG. 12B is a second view of the bracket of FIG. 12A.
Figure 12A:
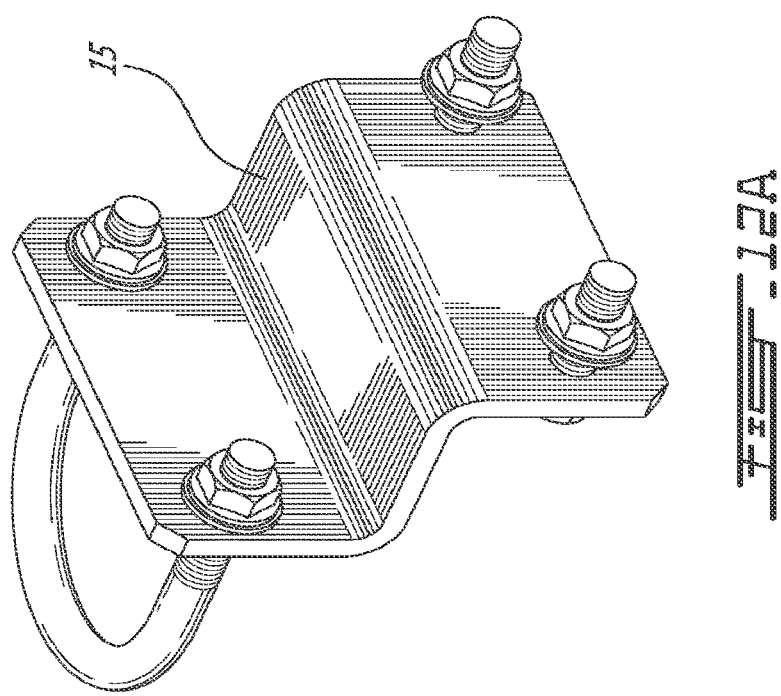
FIG. 12A is a first view of a bracket according to an embodiment of an aspect of the present invention.
Figure 13B:
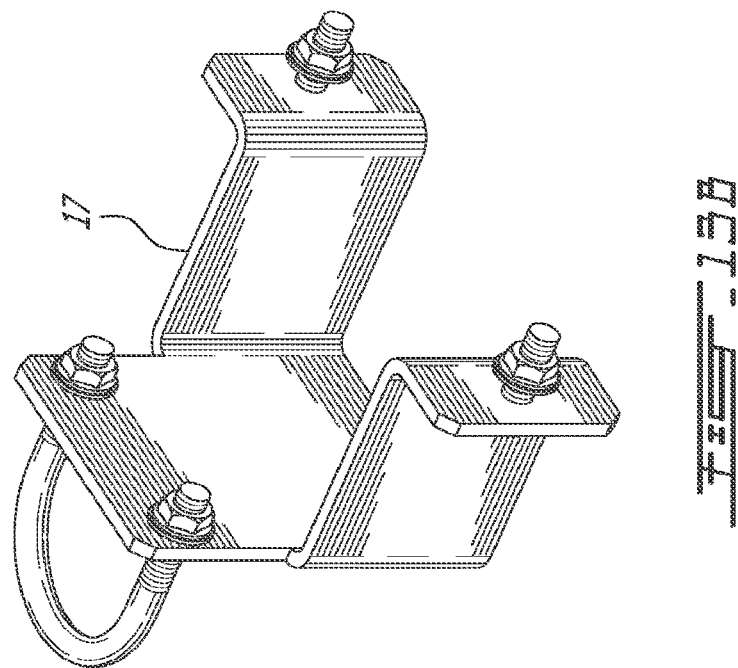
FIG. 13B is a second view of the bracket of FIG. 13A.
Figure 13A:
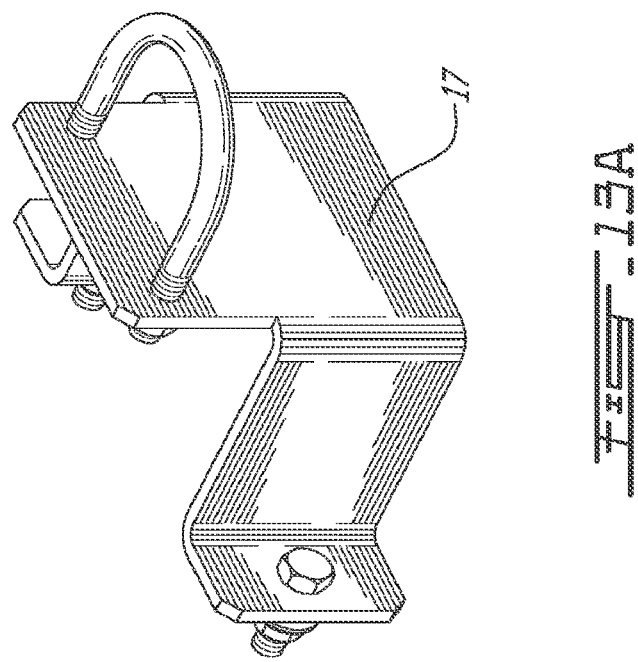
FIG. 13A is a first view of a bracket according to an embodiment of an aspect of the present invention.

The solar panels are positioned relative to the condenser fans (C) using posts 14 supported by the ground (see for example FIGS. 1-3, 5, 10 and 11) or using posts 16 supported by the fan casing 18 itself (see for example FIGS. 6-9). Alternatively the solar panels may be connected to the fan casing 18 itself (see for example FIG. 4). Mounting brackets 15, 17 as illustrated for example in FIGS. 12-13 are used, as best seen in FIG. 10.

Figure 15:
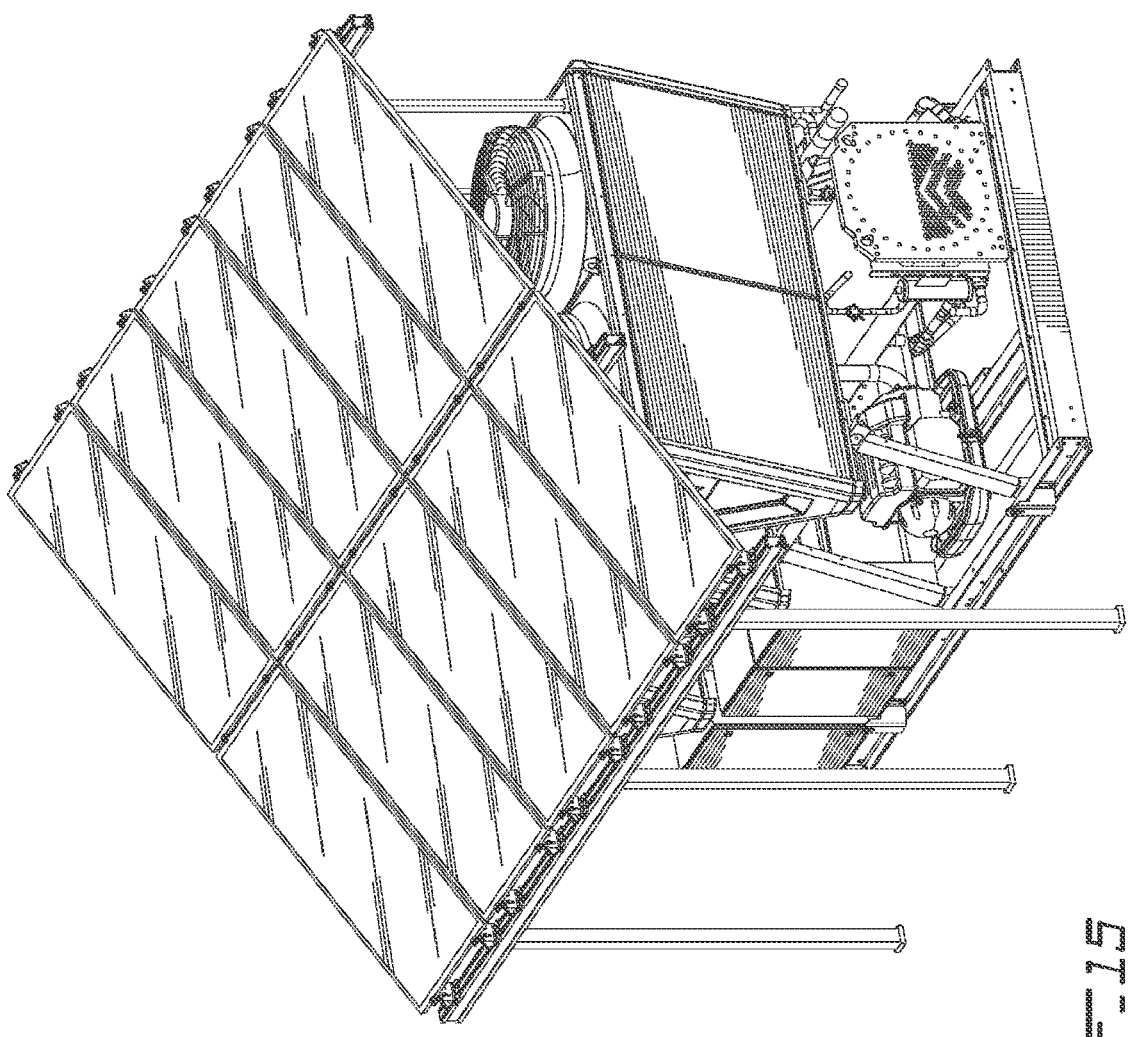
FIG. 15 is a diagrammatic view of a system according to an embodiment of an aspect of the present invention.

At least one, for example two, of the condenser fans comprises a motor than can run on either DC or AC power and these DC/AC motors are connected to the solar array. The remaining condenser fans run on AC power only. When DC power is available, these condenser fans that can run on either DC or AC power run before any of the AC-only driven condenser fans (see FIG. 15).

The system comprises a controller 20 that determines when sufficient DC power is available to run the fans. When DC power is not sufficient, the controller 20 switches to allow AC power to be delivered to the fan motors. The controller 20 also determines that when the chiller is not called on for duty and DC power is available, the power is interrupted until the chiller is called to run.

Figure 14:
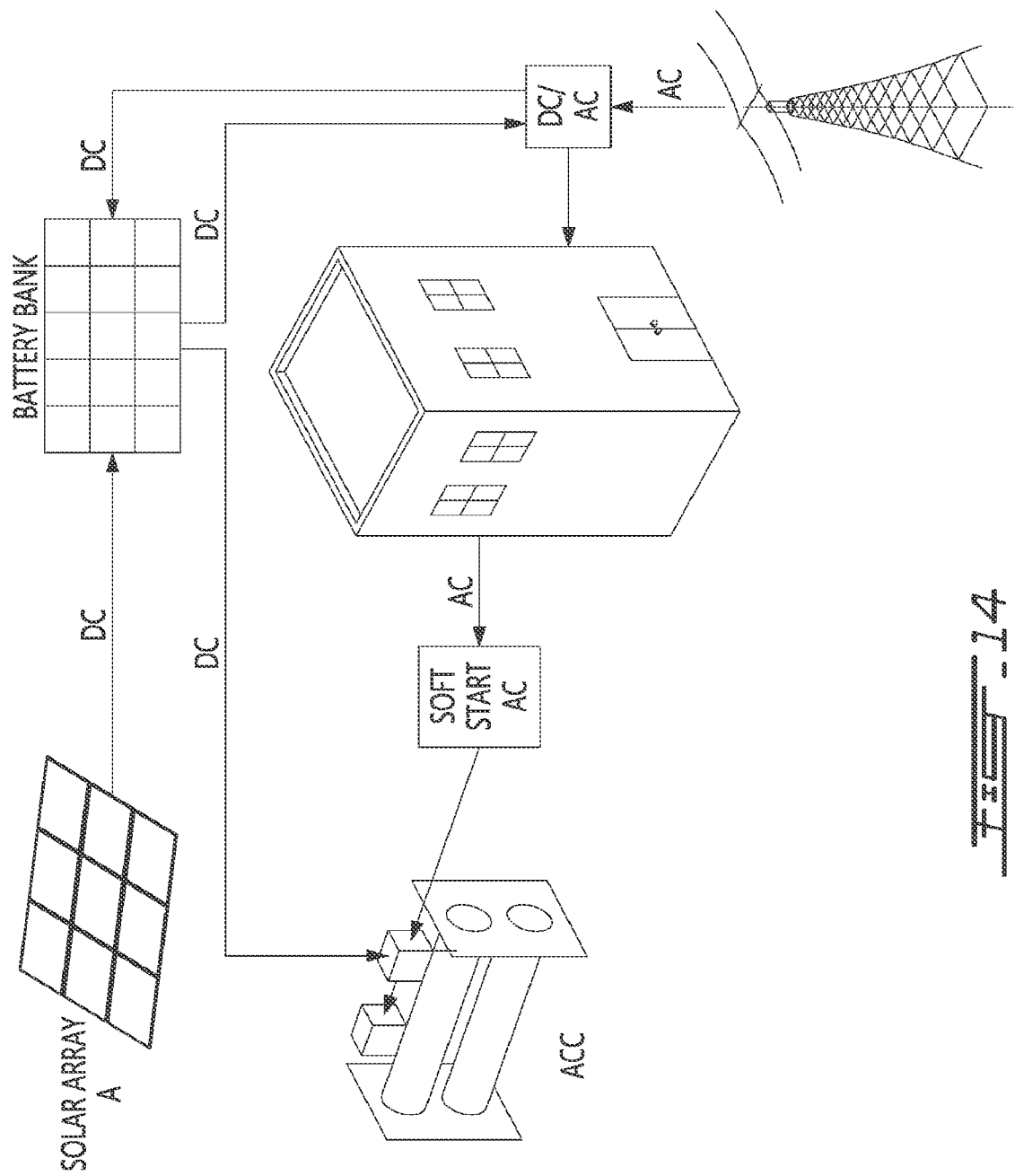
FIG. 14 is a diagrammatic view of a method according to embodiments of an aspect of the present invention.

A battery bank, as shown in FIG. 14, may be used to power the condenser fans over short period of times, for example during passage of clouds covering the sun, thereby providing a buffer period during which there is no switch from DC to AC powering of the fans.

A measure of chiller efficiency based as developed by the Air-Conditioning, Heating and Refrigeration Institute (AHRI) is the Integrated Part Load Value (IPLV), most commonly used to describe the performance of a chiller capable of capacity modulation. Unlike an EER (Energy Efficiency Ratio) or COP (coefficient of performance), which describes the efficiency at full load conditions, the IPLV is derived from the equipment efficiency while operating at various capacities. Since a chiller does not always run at 100% capacity, the EER or COP is not an ideal representation of the typical equipment performance. The IPLV is a very important value to consider since it can affect energy usage and operating costs throughout the lifetime of the equipment. Using a system of the invention comprising an array of 15 solar panels (3×5) mounted above the condenser fans at a minimum height of 450 mm above the top edge of the condenser fans, and two of the condensers of 6 comprising a motor which can run on either DC or AC power (see FIGS. 10-11), during sunshine hours, i.e. when solar power replaced AC to these two fans, the IPLV was shown to be improved by as much as 15%. A typical condenser fan motor consumes 2.1 kW at full load. The system with the solar array produced up to 4.2 kW. During part load situations, the fan power could be fully displaced at 25% load. On sunny days in low ambient conditions, free cooling can be added automatically, further reducing power requirements in winter.

FIG. 14 shows a battery bank to store energy to run the fans during short periods of time when cloud cover prevents the solar array (A) from operation for example. This time period is dependent of the amount of batteries used, typically one hour for example. Moreover, the battery bank can provide DC voltage to the building if the chiller is not in use.

The present method and system provides using DC solar-generated current to directly power AC/DC convertible fans. Up to 15% efficiency increase has been recorded in prototype test when solar power replaces AC to two fan arrays. Payback of the solar addition can be as little as 12 months in sunny locations with power costing 24c/kWh. On sunny days in low ambient conditions, free cooling can be added automatically, further reducing power requirements in winter.

In high density cities with high rise buildings that include residences located close to an air cooled chiller, the noise levels can be so high that it can have an adverse effect on residents. By placing the present solar array above the main noise source, i.e. the condenser fans, the present system and method provide a noise abatement ability to lower noise affects.

Because the solar array is designed to overhang the condenser coils of the chiller, a shading affect occurs thus improving the heat transfer by the air passing over the condenser coils thus improving the chiller efficiency. Thus, the mounting of photovoltaic panels in a canopy adds weather protection and enhances aerodynamic efficiency of fan exhausts (see for example FIG. 15).

Currently today, all solar photovoltaic systems require inverters, utility grid protection equipment and sometimes battery systems. The present system is a direct-connect to the AC/DC fan motors thus eliminating the need for an inverter and utility grid protection equipment.

Typical back side temperatures on the solar panels are above 125 F. As back side temperatures are reduced, the panel efficiency improves. Since the solar array is mounted above the condenser fans, the air temperature from the condenser fans is kept under 115 F maximum thus providing a 10 degrees improvement and thus improving panel temperatures.

Further consideration may be to place a thermal heat recovery system on the back side of the solar panels for pre-heating domestic hot water systems for example. For example, the solar array can be equipped with a hot water heat recover system on the back side of the panels, which allows for pre heating domestic hot water. This system requires a water pump with piping and valves. The water flows through the panels and the heat from the sun provides water between 130 and 140° F.

The present combination forms an integrated system that uses solar power to drive condenser fans which are part of an air cooled oil-free centrifugal chiller.

The present system and method allows use of solar power when available without AC/DC conversion.

The scope of the claims should not be limited by the embodiments set forth in the examples, but should be given the broadest interpretation consistent with the description as a whole.

The invention claimed is:

1. An air cooled oil-free centrifugal chiller system, comprising:
   at least one condenser coil;
   at least one AC condenser fan;
   at least one solar panel configured to generate DC power;
   at least one AC/DC convertible fan connected to the at least one solar panel, the at least one AC/DC convertible fan configured to run on either DC power or AC power; and
   a controller;
   wherein said controller is configured to determine when sufficient DC power generated by the at least one solar panel is available and activating said at least one AC/DC convertible fan with said DC power when sufficient DC power is available, and when DC power is not sufficient, activating the at least one AC condenser fan.

2. The system of claim 1, wherein said controller is configured to determine whether the chiller system is called on for duty and the DC power is sufficient, and interrupting delivery of the DC power to said at least one AC/DC convertible fan when the chiller is not called on for duty.

3. The system as claimed in claim 1, further comprising a battery bank, said controller being configured, when the DC power is not sufficient, to power said at least one AC/DC convertible fan using said battery bank during a period of time before activating the at least one AC condenser fan.

4. The system as claimed in claim 1, wherein said solar panel is mounted above said condenser fans.

5. The system as claimed in claim 1, wherein said solar panel is mounted above the condenser fans at an angle in a range between about 15 and 40°.

6. The system as claimed in claim 1, wherein said solar panel is mounted above the condenser fans at a height of about 450 mm from a top surface of the condenser fans.

7. The system as claimed in claim 1, wherein said solar panel is mounted above the condenser fans at an angle in a range between about 15 and 40° and at a height of about 450 mm from a top surface of the condenser fans.

8. The system as claimed in claim 1, wherein said controller is configured to activate said at least one AC/DC convertible fan with AC power when the DC power is not sufficient.

9. A method for powering an air cooled oil-free centrifugal chiller system comprising condensers, at least one AC/DC convertible fan configured to run on either DC power or AC power, and at least one AC fan, the method comprising
generating DC power with at least one solar panel and connecting the AC/DC convertible fan to the at least one solar panel;
determining i) when the DC power generated by the solar panel is sufficient and, and ii) when the DC power generated by the solar panel is not sufficient;
activating the AC/DC convertible fan when the DC power is sufficient; and
activating the AC fan when DC power is not sufficient.

10. The method of claim 9, further comprising, when the DC power generated by the solar panel is not sufficient, powering the AC/DC convertible fan using a battery bank during a period of time before activating the AC fan.

11. The method of claim 9, including activate said at least one AC/DC convertible fan with AC power when the DC power is not sufficient.

12. A method for directly powering a AC/DC convertible fan of an air cooled oil-free centrifugal chiller using DC solar-generated power, comprising providing at least one solar panel and a controller; connecting the AC/DC convertible fan to the at least one solar panel; determining, by the controller, i) when the DC solar generated power is sufficient and then activating the AC/DC convertible fan, and ii) when the DC solar-generated power is not sufficient, activating the AC/DC convertible fan using a battery bank.

* * * * *